United States Patent
Grubisic (10) Patent No.: US 11,561,898 B1
(45) Date of Patent: Jan. 24, 2023

(54) ADDRESS EXPANSION

(71) Applicant: Arm Limited, Cambridge (GB)

(72) Inventor: Roko Grubisic, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/509,348

(22) Filed: Oct. 25, 2021

(51) Int. Cl.
*G06F 12/08* (2016.01)
*G06F 3/06* (2006.01)
*G06F 12/0802* (2016.01)

(52) U.S. Cl.
CPC .......... *G06F 12/0802* (2013.01); *G06F 3/062* (2013.01); *G06F 3/0629* (2013.01); *G06F 3/0673* (2013.01); *G06F 2212/60* (2013.01)

(58) Field of Classification Search
CPC . G06F 12/08; G06F 12/14; G06F 3/06; G06F 12/02; G06F 12/10
See application file for complete search history.

(56) References Cited

U.S. PATENT DOCUMENTS

| | | | | |
|---|---|---|---|---|
| 8,402,248 | B2 * | 3/2013 | Meier | G06F 12/1009 711/202 |
| 2016/0371496 | A1 * | 12/2016 | Sell | G06F 12/14 |
| 2020/0183854 | A1 * | 6/2020 | Johns | G06F 12/1036 |
| 2021/0326134 | A1 * | 10/2021 | Grocutt | G06F 9/355 |

FOREIGN PATENT DOCUMENTS

| | | | | | |
|---|---|---|---|---|---|
| GB | 2282470 | A | * | 4/1995 | ......... G06F 12/0292 |
| GB | 2593487 | A | * | 9/2021 | ......... G06F 12/1009 |
| WO | WO-2016204913 | A1 | * | 12/2016 | ............. G06F 12/14 |

OTHER PUBLICATIONS

G. Chen, L. Zhang, R. Budhiraja, X. Shen and Y. Wu, "Efficient Support of Position Independence on Non-Volatile Memory," 2017 50th Annual IEEE/ACM International Symposium on Microarchitecture (MICRO), 2017, pp. 191-203.*

* cited by examiner

*Primary Examiner* — Pierre Michel Bataille
(74) *Attorney, Agent, or Firm* — Nixon & Vanderhye P.C.

(57) ABSTRACT

Apparatuses for address expansion and methods of address expansion are disclosed. Memory region definitions are stored, each comprising attribute data relevant to a respective memory region. In response to reception of a first address a region identifier indicative of a memory region to which the first address belongs is provided. Cache storage stores data in association with an address tag and in response to a cache miss a data retrieval request is generated. Address expansion circuitry is responsive to the data retrieval request to initiate a lookup for attribute data relevant to the memory region to which the first address belongs. The address expansion circuitry expands the first address in dependence on a base address forming part of the attribute data to generate an expanded second address, wherein the expanded second address is part of greater address space than the first address.

17 Claims, 8 Drawing Sheets

ADDRESS EXPANSION

TECHNICAL FIELD

The present disclosure relates to data processing. In particular, the present disclosure relates to the address expansion of a first address to form a second address.

DESCRIPTION

A data processing system may comprise components which make use of different address spaces. For example, a data processing system may comprise a first component which uses, say, 32-bit addresses, and a second component which uses, say, 64-bit addresses. To take just one example, this may be the case where a 32-bit control processor is embedded in a 64-bit accelerator. In order to integrate these two components with one another and allow, say, the 32-bit control processor to control aspects of the operation of the 64-bit accelerator, a mechanism needs to be put in place to allow the 32-bit control processor to reference 64-bit addresses in the address space used by the accelerator. However, a "segment expander" unit which might be provided for this purpose and be under the control of the 32-bit control processor then requires very careful programming of segment registers and relevant memory protection unit (MPU) regions, as well as careful instruction and data cache maintenance, in particular in the event that any variety of remapping of the 32-bit control processes the view of memory occurs.

SUMMARY

In one example configuration described herein there is apparatus comprising:

memory protection circuitry comprising memory region definition storage configured to store memory region definitions, wherein each memory region definition comprises attribute data relevant to a respective memory region, wherein the memory protection circuitry is responsive to reception of a first address to generate a region identifier indicative of a memory region to which the first address belongs;

cache storage configured to store data retrieved from a memory location indicated by the first address, wherein the data is stored in association with an address tag derived from the first address, wherein the cache storage is responsive to a cache miss with respect to the first address to generate a data retrieval request to retrieve the data, wherein the data retrieval request comprises the first address; and address expansion circuitry responsive to the data retrieval request to trigger a lookup in the memory region definition storage for external attribute data forming part of the attribute data relevant to the memory region to which the first address belongs, wherein the first address is part of a lesser address space and the external attribute data comprises a second base address, wherein the second base address is part of a greater address space, and the address expansion circuitry is responsive to the external attribute data received from the memory region definition storage to expand the first address in dependence on the second base address to generate an expanded second address, wherein the expanded second address is part of the greater address space.

In one example configuration described herein there is apparatus comprising:

memory protection circuitry comprising memory region definition storage means for storing memory region definitions, wherein each memory region definition comprises attribute data relevant to a respective memory region, wherein the memory protection circuitry is responsive to reception of a first address to generate a region identifier indicative of a memory region to which the first address belongs;

cache storage means for storing data retrieved from a memory location indicated by the first address, wherein the data is stored in association with an address tag derived from the first address, wherein the cache storage means is responsive to a cache miss with respect to the first address to generate a data retrieval request to retrieve the data, wherein the data retrieval request comprises the first address;

lookup means for triggering, in response to the data retrieval request, a lookup in the memory region definition storage means for external attribute data forming part of the attribute data relevant to the memory region to which the first address belongs, wherein the first address is part of a lesser address space and the external attribute data comprises a second base address, wherein the second base address is part of a greater address space; and address expansion means for expanding the first address, in response to the external attribute data received from the memory region definition storage, in dependence on the second base address to generate an expanded second address, wherein the expanded second address is part of the greater address space.

In one example configuration described herein there is a method of address expansion comprising:

storing memory region definitions in memory region definition storage, wherein each memory region definition comprises attribute data relevant to a respective memory region;

generating, in response to reception of a first address, a region identifier indicative of a memory region to which the first address belongs;

caching data retrieved from a memory location indicated by the first address, wherein the data is stored in association with an address tag derived from the first address;

generating, in response to a cache miss with respect to the first address, a data retrieval request to retrieve the data, wherein the data retrieval request comprises the first address;

triggering a lookup in the memory region definition storage, in response to the data retrieval request, for external attribute data forming part of the attribute data relevant to the memory region to which the first address belongs, wherein the first address is part of a lesser address space and the external attribute data comprises a second base address, wherein the second base address is part of a greater address space; and expanding the first address, in response to the external attribute data received from the memory region definition storage, in dependence on the second base address to generate an expanded second address, wherein the expanded second address is part of the greater address space.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of example configurations is provided.

In accordance with one example configuration there is provided an apparatus comprising:

memory protection circuitry comprising memory region definition storage configured to store memory region definitions, wherein each memory region definition comprises attribute data relevant to a respective memory region, wherein the memory protection circuitry is responsive to reception of a first address to generate a region identifier indicative of a memory region to which the first address belongs;

cache storage configured to store data retrieved from a memory location indicated by the first address, wherein the data is stored in association with an address tag derived from the first address, wherein the cache storage is responsive to a cache miss with respect to the first address to generate a data retrieval request to retrieve the data, wherein the data retrieval request comprises the first address; and address expansion circuitry responsive to the data retrieval request to trigger a lookup in the memory region definition storage for external attribute data forming part of the attribute data relevant to the memory region to which the first address belongs, wherein the first address is part of a lesser address space and the external attribute data comprises a second base address, wherein the second base address is part of a greater address space, and the address expansion circuitry is responsive to the external attribute data received from the memory region definition storage to expand the first address in dependence on the second base address to generate an expanded second address, wherein the expanded second address is part of the greater address space.

The present techniques propose an approach according to which only minor adaptation of memory protection circuitry and of cache storage is required, despite these components being part of an apparatus which is arranged to expand first addresses into second addresses. In the above, the first addresses are described as being part of a lesser address space and the second addresses as described as being part of a greater address space, where this refers to the respective length of an address in each address space (i.e. the number of bits of an arbitrary address in each address space), where it will be immediately understood by one of ordinary skill in the art that the bit length of the address defines the range of the address space (such that a 64-bit (virtual) address space can directly map to a much larger memory range than a 32-bit (virtual) address space—even though it is common contemporary practice for only 48 bits of such a 64-bit to be actively used for unique addressing). The functionality of the address expansion is achieved, without this requiring significant expansion of the memory protection circuitry and the cache storage, by positioning the address expansion circuitry downstream of the cache storage. Additionally, memory region definition storage forming part of the memory protection circuitry is arranged to store region identifiers in association with appropriate corresponding information to enable the address expansion circuitry to perform the address expansion. However, this information is only provided by the memory protection circuitry to the address expansion circuitry once a first address reaches the address expansion circuitry and requires address expansion. At this point the address expansion circuitry has the capability to initiate a lookup in memory region definition storage forming part of the memory protection circuitry on basis of a region identifier to which the relevant address belongs. Thus the memory protection circuitry can then provide the address expansion circuitry with appropriate information to enable it to perform the address expansion on the basis of the region identifier. This arrangement provides in particular that the cache storage does not hold expanded addresses and attribute information, but rather only holds data in association with tags based on the first addresses in the usual manner (with only the possible addition of region identifier information in some example embodiments). Accordingly, the content of the cache storage is kept simple and easier to administer.

Although not essential, in some examples the cache storage is further configured to store the region identifier in association with the address tag, and the cache storage is responsive to the cache miss with respect to the first address to generate the data retrieval request further comprising the region identifier. This then provides for a straightforward information flow through the apparatus, whereby a region identifier associated with the first address is provided by the memory protection circuitry, and is stored in association with the address tag in the cache storage. Further, when a cache miss occurs, the region identifier can be provided in association with the first address by the cache storage to the address expansion circuitry, such that the address expansion circuitry can directly initiate its lookup in the memory region definition storage of the memory protection circuitry using the region identifier, and thus receive the required information for the address expansion to be carried out.

The storage of the region identifier in association with the address tag in the cache storage facilitates a number of possible cache maintenance operations. Accordingly, in some examples the cache storage is responsive to a cache maintenance signal, wherein the cache maintenance signal comprises a region identifier signal, to carry out a cache maintenance operation with respect to content of the cache storage which is stored in association with a region identifier corresponding to the region identifier signal.

The cache maintenance operations may take a variety of forms, but in some examples the cache maintenance signal is a cache invalidation signal and the cache maintenance operation is a cache invalidation operation. In other words, the cache invalidation can then be performed on a region identifier basis, facilitating the ease with which updates to the memory mappings handled by the memory protection circuitry (and cached in the cache storage) can be securely carried out, since a current memory mapping may correspond to a first region identifier and a new memory mapping may correspond to a second region identifier. Data associated with the current memory mapping can thus be protected by performing a cache invalidation using the first region identifier, thus invalidating all data associated with the current memory mapping in the cache storage.

The external attribute data received from the memory region definition storage may take a variety of forms, but in some examples the external attribute data received from the memory region definition storage comprises a mask value, and the address expansion circuitry is configured to apply the mask value to the first address to utilise a subset of the first address when generating the expanded second address. Thus all or only a portion of the first address may be used to generate the expanded second address.

Further examples of the nature of the external attribute data received from the memory region definition storage provide that the external attribute data received from the memory region definition storage comprises an address space identifier for use in the greater address space, wherein the address expansion circuitry is configured to interface to a system bus, and the address expansion circuitry is configured to provide the expanded second address and the address space identifier as a transaction to be conveyed via the system bus.

Still further examples of the nature of the external attribute data received from the memory region definition storage provide that the external attribute data received from the memory region definition storage comprises transaction attributes relevant to the memory region, wherein the address expansion circuitry is configured to interface to a system bus, and the address expansion circuitry is configured to provide the expanded second address and the transaction attributes as a transaction to be conveyed via the system bus.

The transaction attributes may be provided in a variety of ways, but in some examples the address expansion circuitry is configured to provide the transaction attributes as configurable width user bits in the transaction to be conveyed via the system bus.

The memory region definitions may be established in the memory region definition storage in a variety of ways and in some examples the apparatus further comprises an initial region setup port arranged to provide access to the memory region definition storage on system start-up to allow setting of the memory region definitions on system start-up.

In some examples the cache storage is an instruction cache. In some examples the cache storage is a data cache storage configured to store modifiable data items.

The address expansion functionality may be triggered in a variety of contexts and accordingly in some examples the data cache storage is arranged to generate a write back request with respect to dirty data evicted from the data cache storage, wherein the write back request comprises a write back address; and the address expansion circuitry is responsive to the write back request to trigger a further lookup in the memory region definition storage for external attribute data forming part of the attribute data relevant to the memory region to which the write back address belongs, and the address expansion circuitry is responsive to the external attribute data received from the memory region definition storage to expand the write back address to generate an expanded write back address.

In some examples the address expansion circuitry may support more than one channel such as wherein the data retrieval request is received by the address expansion circuitry on a read channel, and the write back request is received by the address expansion circuitry on a write channel, and wherein the address expansion circuitry is configured to multiplex between the data retrieval request and the write back request.

Depending on the system requirements there may be the desire to allow parallelised access to the memory region definition storage and accordingly in some examples the data retrieval request is received by the address expansion circuitry on a read channel, and the write back request is received by the address expansion circuitry on a write channel, wherein the memory region definition storage comprises multiple lookup ports, and wherein the address expansion circuitry is configured to trigger the lookup for the data retrieval request and the further lookup for the write back request via respective lookup ports of the multiple lookup ports.

The address expansion circuit may be provided with a particular configuration in which it does not perform the address expansion and in some examples this is supported by the address expansion circuitry being responsive to the second base address having a value of zero to output the first address unmodified.

As mentioned above it is not essential for the region identifiers to be stored in association with address tags in the cache storage, and in such examples the address expansion circuitry is responsive to the data retrieval request to trigger a first lookup in the memory region definition storage for the region identifier indicative of the memory region to which the first address belongs, and, subsequently as a second lookup, the lookup in the memory region definition storage for the external attribute data forming part of the attribute data relevant to the memory region to which the first address belongs.

In accordance with one example configuration there is provided an apparatus comprising:

memory protection circuitry comprising memory region definition storage means for storing memory region definitions, wherein each memory region definition comprises attribute data relevant to a respective memory region, wherein the memory protection circuitry is responsive to reception of a first address to generate a region identifier indicative of a memory region to which the first address belongs;

cache storage means for storing data retrieved from a memory location indicated by the first address, wherein the data is stored in association with an address tag derived from the first address, wherein the cache storage means is responsive to a cache miss with respect to the first address to generate a data retrieval request to retrieve the data, wherein the data retrieval request comprises the first address;

lookup means for triggering, in response to the data retrieval request, a lookup in the memory region definition storage means for external attribute data forming part of the attribute data relevant to the memory region to which the first address belongs, wherein the first address is part of a lesser address space and the external attribute data comprises a second base address, wherein the second base address is part of a greater address space; and and address expansion means for expanding the first address, in response to the external attribute data received from the memory region definition storage, in dependence on the second base address to generate an expanded second address, wherein the expanded second address is part of the greater address space.

In accordance with one example configuration there is provided a method of address expansion comprising:

storing memory region definitions in memory region definition storage, wherein each memory region definition comprises attribute data relevant to a respective memory region;

generating, in response to reception of a first address, a region identifier indicative of a memory region to which the first address belongs;

caching data retrieved from a memory location indicated by the first address, wherein the data is stored in association with an address tag derived from the first address;

generating, in response to a cache miss with respect to the first address, a data retrieval request to retrieve the data, wherein the data retrieval request comprises the first address;

triggering a lookup in the memory region definition storage, in response to the data retrieval request, for external attribute data forming part of the attribute data relevant to the memory region to which the first address belongs, wherein the first address is part of a lesser address space and the external attribute data comprises a second base address, wherein the second base address is part of a greater address space; and expanding the first address, in response to the external attribute data received from the memory region definition storage, in dependence on the second base address to generate an expanded second address, wherein the expanded second address is part of the greater address space.

Particular embodiments will now be described with reference to the figures.

Figure 1:
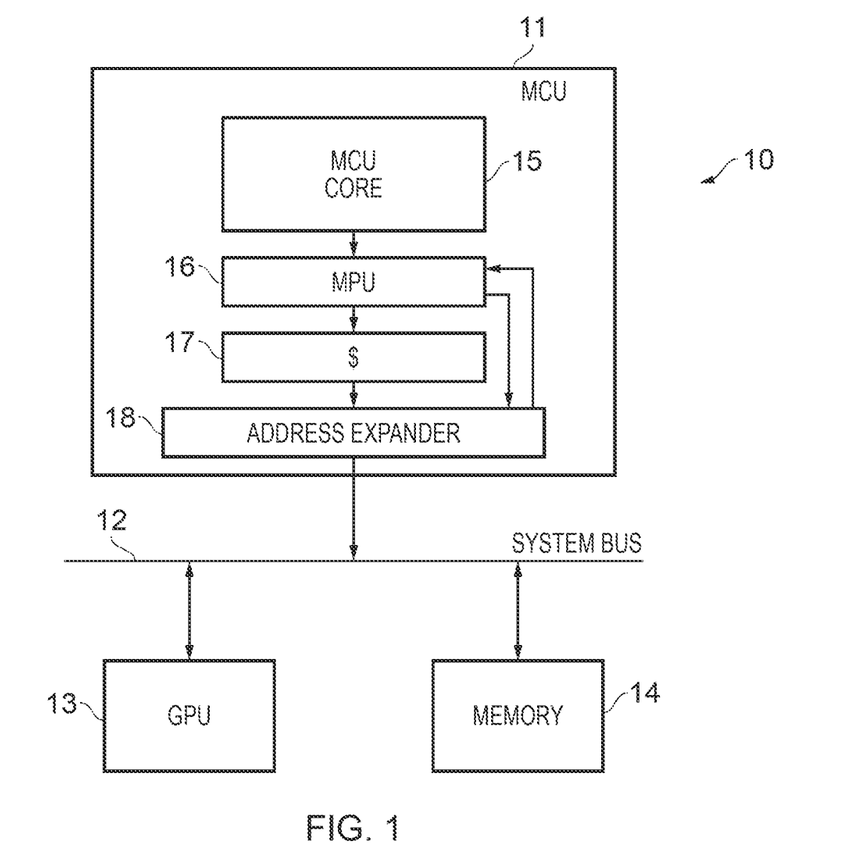
FIG. 1 schematically illustrates a data processing system in accordance with some example configurations.

FIG. 1 illustrates a data processing system 10 in accordance with one example. The system 10 comprises a microcontroller unit (MCU) 11 coupled to a system bus 12. Also coupled to the system bus 12 are a graphics processing unit (GPU) 13 and a memory 14. The MCU 11 is provided to enhance and facilitate the operation of the system which includes the GPU 13 and runs control firmware for this purpose. As such, in this example the MCU may be described as a "system control processor". Being integrated into the data processing system 10, the MCU 11 is therefore required to also be integrated into the memory systems of the data processing system 10. A particular aspect of this integration of relevant to the present disclosure is the fact that the data processing system 10 uses a 64-bit memory system, whereas the MCU 11 itself natively uses a 32-bit memory model. In order for the MCU 11 to be integrated into the wider data processing system it is provided with address expansion capability, such that a 32-bit memory address used by the MCU core 15 is then appropriately mapped into the 64-bit memory model of the data processing system 10. Note that whilst for simplicity the MCU 11 in FIG. 11 is shown being directly coupled to the system bus 12, in practice a system memory management unit (SMMU) may typically be positioned between the MCU 11 and the system bus 12 in order to, say, allow the sharing of a virtual address space between the system control processor MCU and other system components. The MCU 11 in FIG. 1 is shown to further comprise a memory protection unit 16, a cache 17, and an address expander 18. For the purposes of the generality of the example of FIG. 1, the cache 17 may in some examples be an instruction cache and in some example may be a data cache. A 32-bit memory address issued by the MCU core 15 is received by the MPU 16. In addition to the usual permission checks and attribute retrieval relating to the memory region to which the memory address belongs, in accordance with the present techniques the MPU 16 also stores a region identifier (RID) in association with each defined memory region. A memory access which is allowed to proceed by the MPU 16 initiates a lookup in the cache 17, where the relevant data item may already be (temporarily) stored. When a cache miss occurs then the relevant data item will need to be retrieved from the memory system and the address (here the 32-bit address as issued by the MCU core 15) is then passed to the address expander 18. The address expander 18 initiates a lookup in the MPU 16 on the basis of the region identifier associated with the memory address. Note that, as will be described in more detail with reference to the figures which follow, the RID may be received by the address expander 18 in association with the memory address, or the address expander 18 may initiate a preliminary lookup in the MPU 16 for the RID when it only receives the memory address. On the basis of the RID lookup, the MPU 16 then provides the address expander 18 with various information enabling it to perform the required address expansion, where in this example this is the expansion of the 32-bit address native to the MCU core 15 into a wider address for use in the 64-bit memory system of the data processing system 10, in particular with reference to the memory 14. More detail of the information which the address expander 18 uses in order to perform this address expansion is given below with reference to the figures which follow. Generally, it should be appreciated that although for clarity of illustration the example of FIG. 1 is described in the context of a 32-bit address being expanded for use in a 64-bit memory system, the present techniques are in no way constrained to application to any particular original address size or target (expanded) address size, as long as some variety of address expansion is required.

Figure 2:
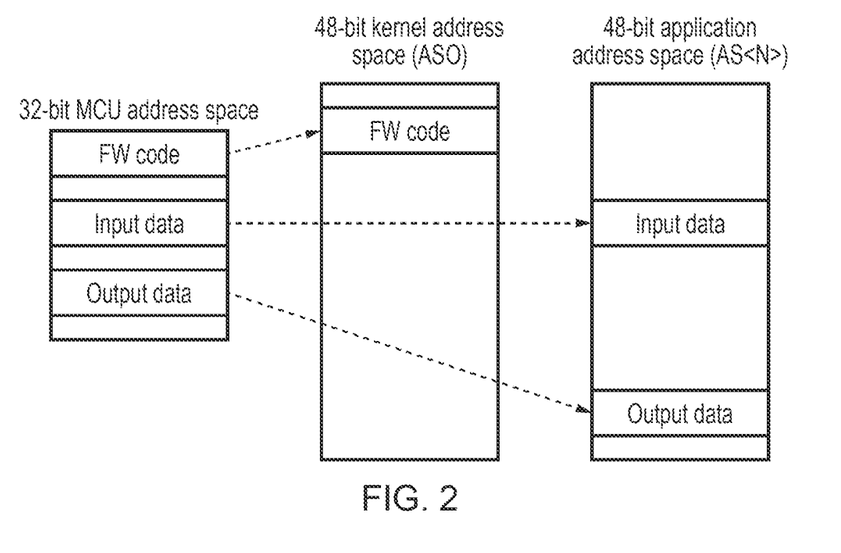
FIG. 2 schematically illustrates the mapping of an example 32-bit address space to a 48-bit kernel address space and a 48-bit application address space in accordance with some example configurations.

FIG. 2 schematically illustrates an example mapping of a 32-bit address space to a 48-bit kernel address space and a 48-bit application address space in accordance with some example configurations. As is common contemporary practice, the 48-bit address spaces are referenced by 64-bit addresses, although only 48 bits are used since that provides an ample address range for contemporary purposes. The 32-bit MCU address space shows three blocks of data which are mapped into a "wider" address space. Here that wider address space is shown as a 48-bit kernel address space (AS0) into which the firmware (FW) code is mapped and a 48-bit application address space (AS<N>) into which the input data and output data is mapped. The address space identifiers AS<x> are used to distinguish between memory pages. The address expansion techniques disclosed herein facilitate such mapping and the interface between natively 32-bit components of a data processing system and natively 64-bit components of the data processing system.

Figure 3:
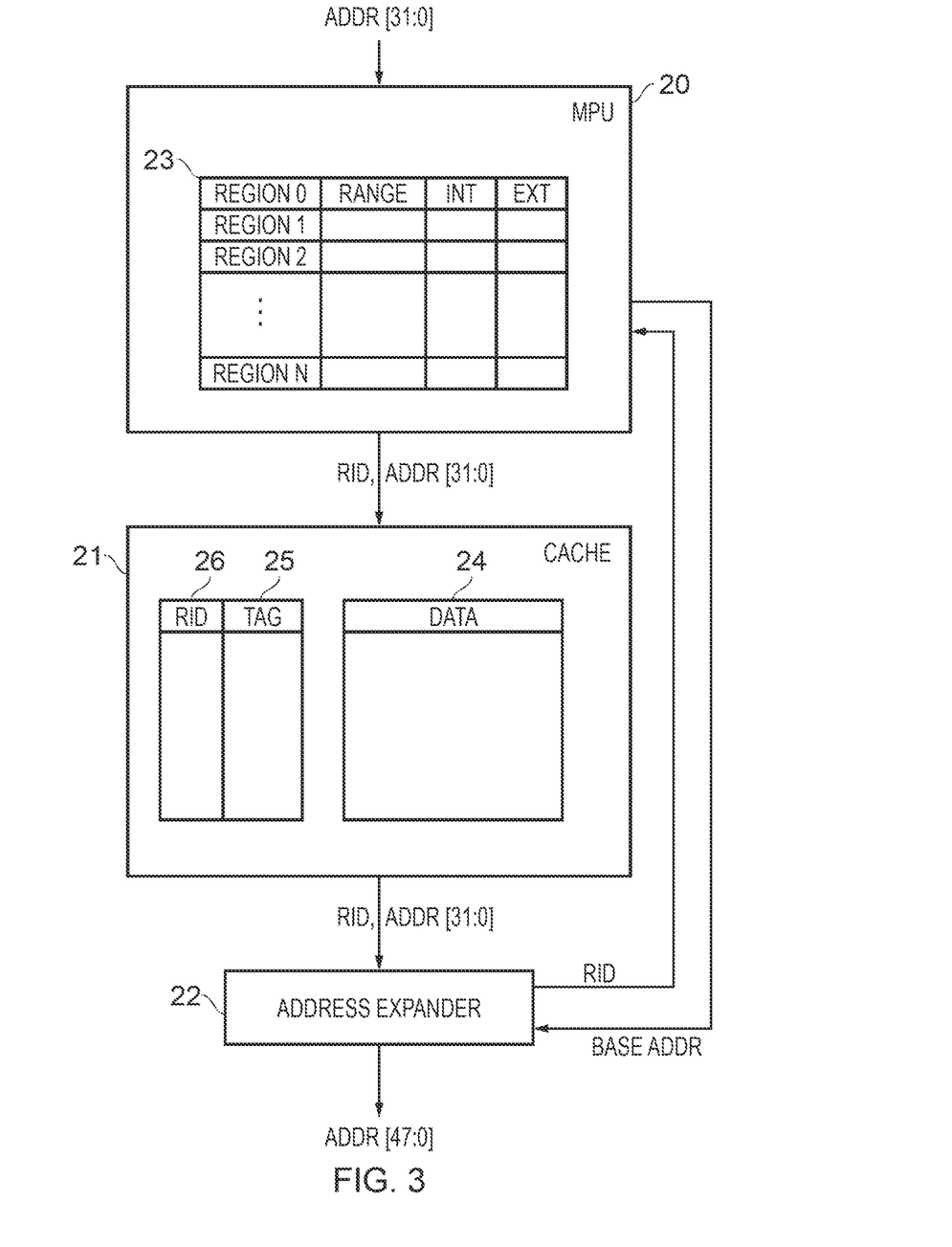
FIG. 3 schematically illustrates some components of a data processing system in accordance with some example configurations.

FIG. 3 illustrates further detail of some components of a data processing system such as that shown in FIG. 1. The components shown are a memory protection unit (MPU) 20, a cache 21, and an address expansion unit 22. In some examples these may be mapped onto the MPU 16, the cache 17, and the address expander 18 in the example of FIG. 1. The MPU 20 receives a 32-bit address for which a processor core (not shown) is seeking memory access. This 32-bit address may for the purposes of the discussion of FIG. 3 either represent the address of an instruction or the address of a data item which is to be used in the processor core's data processing. The MPU 20 is further shown to comprise memory region definition storage 23, which holds memory region definitions. These comprise a range definition (e.g. a start and end address, or a base address and a range size), as well an "internal" and "external" attribute data. Broadly speaking the "internal" attributes correspond to the usual memory permissions and attributes which an MPU handles for the memory system it protects, whilst the "external" attributes correspond to aspects relating to the memory system for which the address expansion is occurring. In particular, one value which forms part of the "external" attributes is a base address, which is used by the address expander in forming the expanded address, as is described in more detail below. The 32-bit address received by the MPU 20 causes a lookup to be performed in the memory region definitions, such that the memory region to which the address belongs can be identified. A corresponding memory region identifier (RID) is thus derived from the lookup and accompanies the 32-bit address beyond the memory protection unit. Here it is assumed that the other checks which an MPU typically performs (e.g. to determine if the process seeking access to this memory region is indeed allowed to) have passed.

The 32-bit address and RID are received by the cache 21 and a cache lookup is initiated. A data item stored in the cache (typically by means of an entire cache line of data having been retrieved from the memory system comprising the data item) are stored in association with a tag portion of the address. Here in addition the memory region identifier RID is also stored in association with the tag portion of the address. Thus the cache 21 comprises data storage 24, tag storage 25, and RID storage 26. As a result of the cache lookup, if a hit occurs then the requested data item is returned in the usual manner. If however a cache miss occurs then a request is generated by the cache 21 for the requested data item to be returned from the memory system. This request comprises not only the 32-bit address, but also the RID, and these are both received by the address expander 22. Having received the request, the address expander 22 initiates a lookup in the MPU 20, and in particular in the memory region definition storage 23, on the basis of the RID. The MPU 20 thus returns information to the address expander 22 to enable it to perform the required address expansion. In particular, the MPU 20 returns the "external" attribute information stored in association with the relevant memory region (identified by RID). The key component of this external attribute information for the address expander is a base address, whereby this base address is given in the same address size as the target memory addressing into which the address expander is expanding the address it has received. In the example illustrated in FIG. 3 the target memory system is 64-bit based, although as mentioned above only a 48-bit portion of this is actually used. Accordingly, the base address received by the address expander 22 from the MPU 20 is a 48-bit address, to which the address expander 22 then adds the received 32-bit address, in order to form the expanded 48-bit address.

Figure 4:
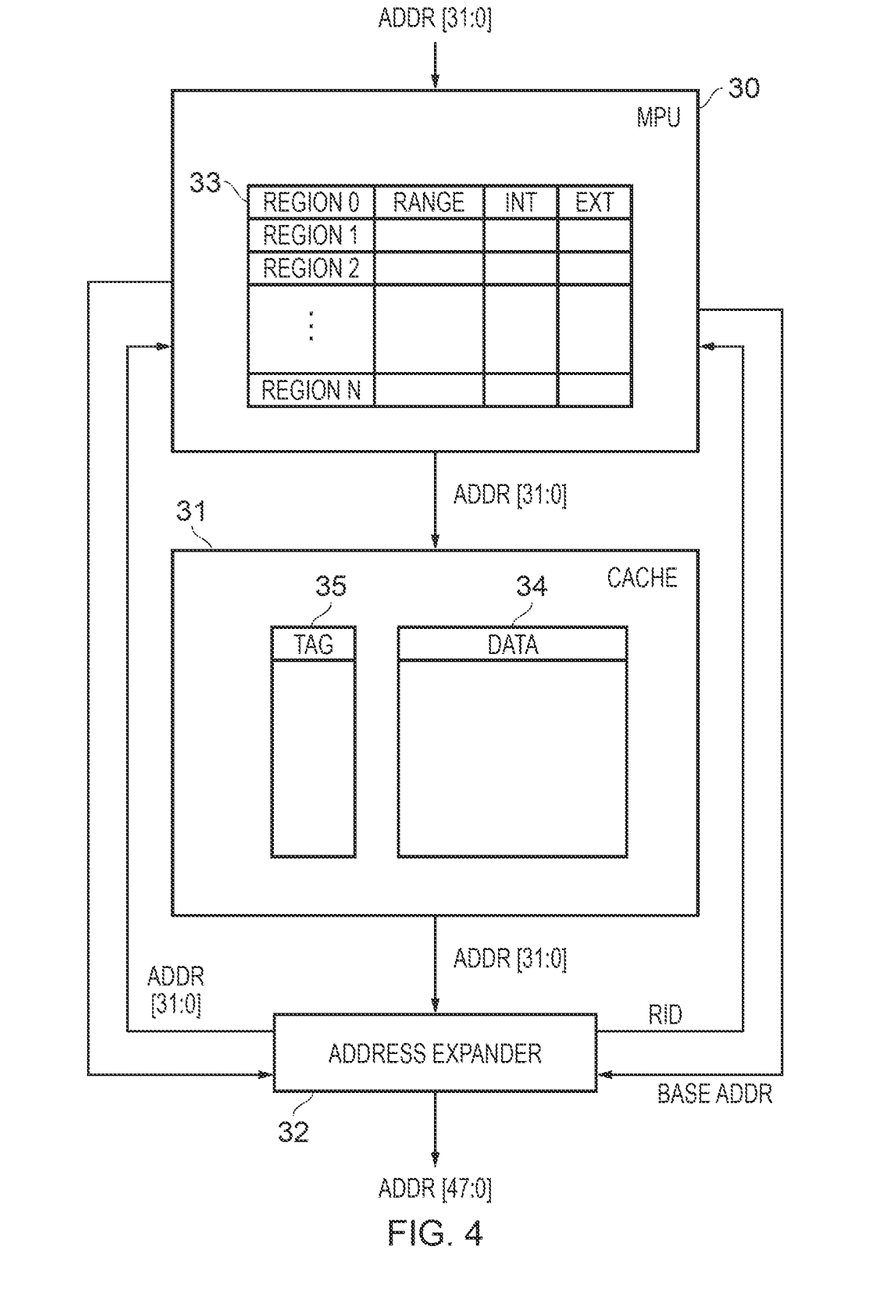
FIG. 4 schematically illustrates some components of a data processing system in accordance with some example configurations.

FIG. 4 illustrates an alternative configuration of the components shown in FIG. 3. The components shown are a memory protection unit (MPU) 30, a cache 31, and an address expansion unit 32. In some examples these may be mapped onto the MPU 16, the cache 17, and the address expander 18 in the example of FIG. 1. As in the case of FIG. 2, the MPU 30 receives a 32-bit address for which a processor core (not shown) is seeking memory access. This 32-bit address may for the purposes of the discussion of FIG. 4 either represent the address of an instruction or the address of a data item which is to be used in the processor core's data processing. The MPU 30 is generally configured in the same way as the MPU 20 of FIG. 3, comprising memory region definition storage 33 holding memory region definitions. However, in distinction to the MPU 20 of FIG. 3, although the 32-bit address received by the MPU 30 also causes a lookup to be performed in the memory region definitions, this is only for the usual purposes of checking the "internal" attributes defined for the memory region to which the address belongs. The corresponding memory region identifier (RID) is not yet retrieved. Hence the 32-bit address is passed from the MPU 30 to the cache 31 alone (i.e. without the RID) and accordingly it can be seen that RIDs are not stored in association with the tag portion 35 of the address in the cache 31. Thus the cache 31 comprises data storage 34 and tag storage 35

A cache lookup in the cache 31 is performed and if a hit occurs then the requested data item is returned in the usual manner. If however a cache miss occurs then a request is generated by the cache 21 for the requested data item to be returned from the memory system. This request comprises only the 32-bit address. On receipt of the address the address expander firstly initiates a lookup in the memory region definition storage 33 in order to determine the RID, which is returned. Having thus received the RID, the address expander 32 initiates another lookup in the MPU 30, and in particular in the memory region definition storage 33, on the basis of the RID. The MPU 30 thus returns information to the address expander 32 to enable it to perform the required address expansion in the same manner as described above with reference to FIG. 3. The address expander 32 thus uses the base address received from the MPU 30 and adds the received 32-bit address, in order to form the expanded 48-bit address.

Figure 5:
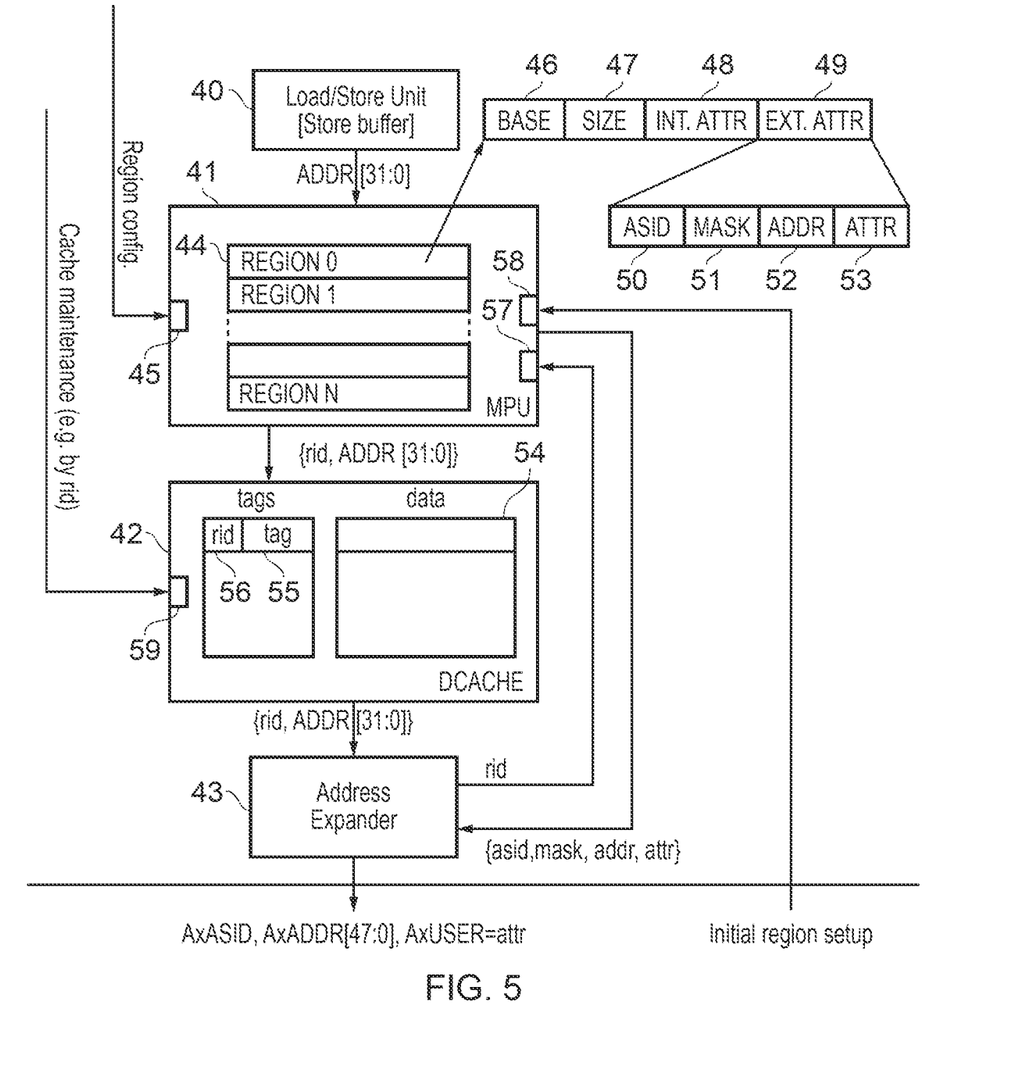
FIG. 5 schematically illustrates some components of a data processing system in accordance with some example configurations.

FIG. 5 illustrates a further example configuration of some of the components of a data processing system. The components shown are load/store unit 40, a memory protection unit (MPU) 41, a data cache 42, and an address expansion unit 43. In some examples these may be mapped onto the MPU 16, the cache 17, and the address expander 18 in the example of FIG. 1. The load/store unit 40 may be provided as part of a data processing apparatus (such as the MCU 11 in FIG. 1) to handle load and store operations initiated by the processor core. In such an example it will then be the load/store unit 40 which passes a 32-bit address to the MPU 41. The MPU 41 comprises memory region definition storage 44, which holds the respective definitions of the memory region is currently defined. The memory region definitions may be relatively static, or may be updated from time to time, allowing the memory mappings seen by processes running on the MCU to change. For this purpose, the MPU 41 is provided with a configuration port 45, allowing a suitably privileged process running in the MCU to modify the memory mappings defined by the region definitions held in the memory region definition storage 44. Furthermore, the MPU 41 is provided with an initial region setup port 58, which provides access to the memory region definition storage 44 on system start-up to allow the initial setting up of the memory region definitions. To support booting from an arbitrary external address (not limited to bottom 4 GB of the external address space), the system integrator can provide an external register driving the special "initial region setup" port on the MCU top-level. Setting this to the correct expansion address and ASID to facilitate the MCU boot would be the responsibility of the associated device driver. Moreover, as shown in FIG. 5, the memory region definitions each comprise a base address value 46, a memory region size value 47, a set of "internal attributes" 48, and a set of "external attributes" 49. The base address value 46 and the memory region size value 47 define the memory region, i.e. the range of (32-bit) memory addresses for which the given internal attributes and external attributes apply. The set of internal attributes 48 comprise the usual permissions data and attribute values which an MPU handles, i.e. defining for the 32-bit view of the memory which processes can access which memory addresses, what actions are permitted, and so on. The external attributes 49 are shown themselves to comprise an ASID value 50, a mask value 51, a (base) address 52, and a set of attribute values 53. These are all items of information which pertain to the expanded address as generated by the address expander 43 and how that expanded address is handled in the 64-bit memory regime which it enters. The optional set of attribute values 53 can take any form that is required by the system in which the present techniques are being implemented (e.g. to indicate cacheable/shared/allocation hints and so on).

The system of FIG. 5 operates generally as described above with reference to FIG. 3, in that the 32-bit address received by the MPU 41 causes a lookup to be performed in the memory region definitions, such that the memory region to which the address belongs can be identified. A corresponding memory region identifier (RID) is thus derived from the lookup and accompanies the 32-bit address beyond the MPU 41. The 32-bit address and RID are received by the data cache 42 and a cache lookup is initiated. A data item stored in the cache (typically by means of an entire cache line of data having been retrieved from the memory system comprising the data item) are stored in association with a tag portion of the address. Here in addition the memory region identifier RID is also stored in association with the tag portion of the address. Thus the data cache 42 comprises data storage 54, tag storage 55, and RID storage 56. As a result of the cache lookup, if a hit occurs then the requested data item is returned in the usual manner. If however a cache miss occurs then a request is generated by the cache 42 for the requested data item to be returned from the memory system. This request comprises not only the 32-bit address, but also the RID, and these are both received by the address expander 43. Having received the request, the address expander 43 initiates a lookup in the MPU 20, this being handled by a special port 57 provided explicitly for this purpose. The lookup on the basis of the RID thus returns the information to the address expander 43 to enable it to perform the required address expansion. In particular, the MPU 41 returns the "external" attribute information stored in association with the relevant memory region (identified by RID).

In the example shown in FIG. 5, the address expander 43 is configured to generate the expanded address as part of a transaction which it passes to a system bus (not illustrated), whereby the transaction is formatted as an AXI transaction (i.e. in accordance with the Advanced eXtensible Interface (AXI), part of the ARM Advanced Microcontroller Bus Architecture (AMBA) specifications). Generally speaking, the address expander 43 uses the base address 52 and mask 51 to form the external address, and it passes the ASID 50 and additional memory attributes information 53 to the external memory system, e.g. with a special ARASID signal, and the extra attributes provided on ARUSER, to be unpacked elsewhere as required. The expansion of the address performed by the address expander 43 may be expressed functionally as:

def expand (addr, rid):
    axasid=mpu_regions[rid].ext_attr.asid
    expansion_base={mpu_regions[rid].ext_attr.addr, 30'h0}
    mask=create_mask(mpu_regions[rid].ext_attr.mask)
    axaddr=addr & mask expansion_base & ~mask
    axuser=mpu_regions[rid].ext_attr.attr Thus in this general example there is support for the top bits [47:30] coming from the expansion, meaning that the top 2 bits of the 32-bit address can be overridden using the "mask" register field which can e.g. contain the number of bits to trim off the top of the input address.

Note that FIG. 5 the data cache 42 is further provided with a cache maintenance port 59, whereby this port enables cache maintenance operations to be signalled to and carried out on the data cache 42. In particular, one type of cache maintenance which the present techniques supports is invalidation by RID. That is to say, a cache invalidation signal is received by the data cache 42 via the cache maintenance port 59, which indicates a selected RID. Cache lines held in the data cache 42 with a corresponding RID can thus be invalidated. This type of invalidation enables efficient region reconfiguration, including handling external mappings safely, as part of normal cache maintenance. Moreover, since this type of invalidation can be performed efficiently in hardware with the comparison of the RID stored with the tags, meaning that other regions' data doesn't have to be flushed, this is beneficial for performance.

An example of region reconfiguration by software (a data region example), showing how the data cache invalidation by RID fits into the flow is given below:

def reconfigure_mpu_region (rid, config):
    DSB
    _dcache_invalidate_by_rid(rid, PoC)
    DSB
    ISB
    _configure_mpu_region(rid, config)
    ISB Thus when reconfiguring an MPU defined memory region (with region identifier RID) the sequence of events as shown in the above functional definition is:

1. a data synchronisation barrier is executed;
2. all RID-tagged data in the data cache are invalidated;
3. a data synchronisation barrier is executed;
4. an instruction synchronisation barrier is executed;
5. the new MPU region definition for this identifier RID is configured;
6. an instruction synchronisation barrier is executed.

Finally, it is noted with respect to the example of FIG. 5, that address expansion need not be carried out and if there is no current requirement to expand the addresses, the external ASID/base address can simply be set to zero for all regions (and the mask bits so selected as to preserve the entire MCU address). This is the "degenerative" case that makes the MPU behave like a traditional MPU. If the MPU is off, it can e.g. default to region RID=0 for everything and use the externally provided "Initial region setup" for that.

Figure 6:
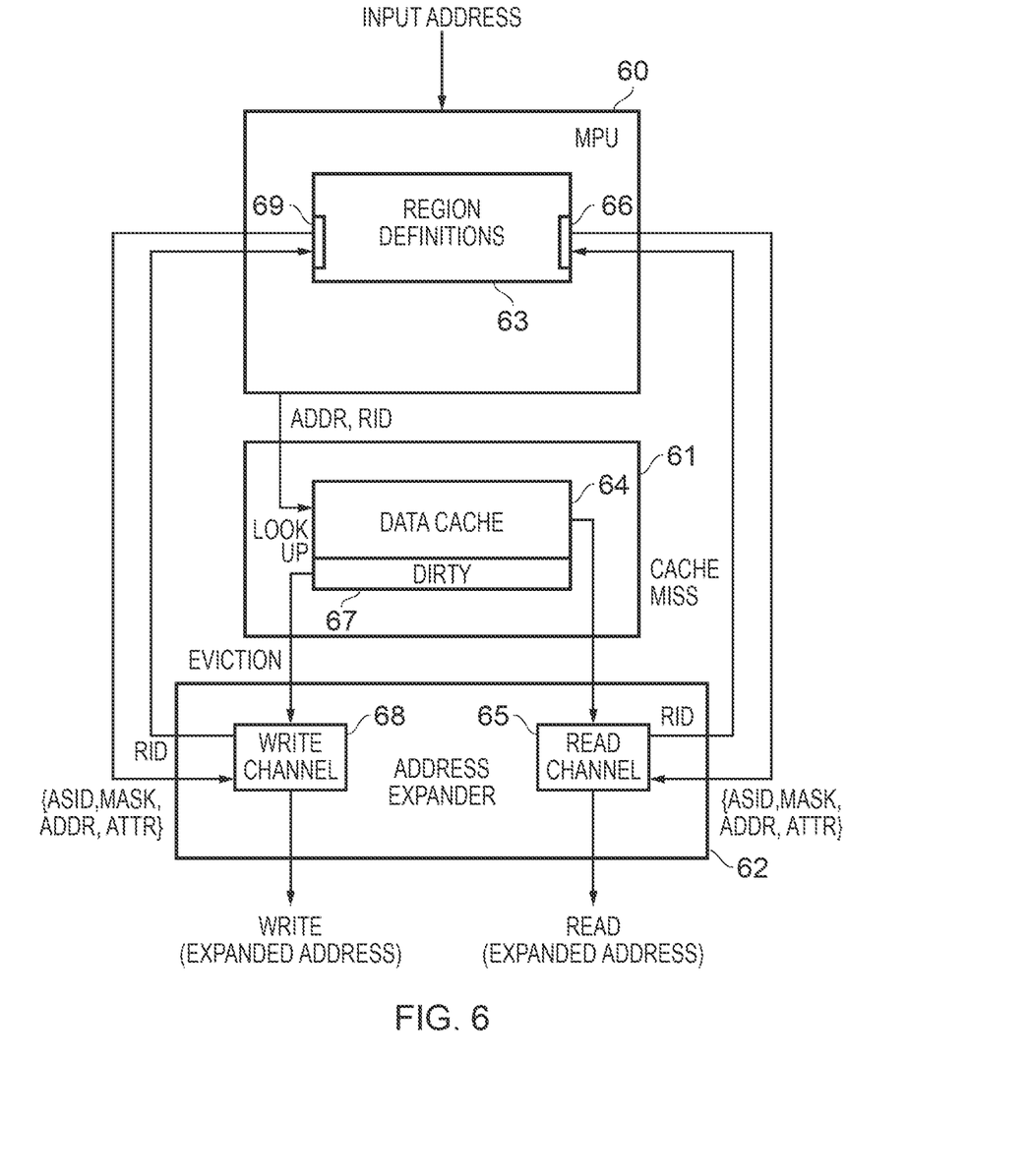
FIG. 6 schematically illustrates some components of a data processing system in accordance with some example configurations.

FIG. 6 schematically illustrates a further example of some components of a data processing system in accordance with example configurations. An MPU 60, a data cache 61, and an address expander 62 are shown. The MPU 60 holds memory region definitions 63, which can be configured in accordance with any of the examples discussed above. An address and associated RID passed from the MPU 62 the data cache 61 causes a lookup in the data cache storage 64. In the event of a cache hit the required data is returned. In the event of a cache miss, a request for the required cache line is handled by a read channel 65 of the address expander 62. This initiates the RID lookup in the memory region definitions 63 via a first access port 66. The information returned (ASID; MASK; ADDR; ATTR) is used as described above with reference to FIG. 5 to expand the address and to provide the expanded address as part of an AXI read transaction, which causes the required cache line to be retrieved from the memory system into which the address expanded 62 is interfacing. When an allocation into the data cache 64 causes the eviction of a dirty cache line 67, this is handled by a write channel 68 of the address expander 62. This initiates another RID lookup in the memory region definitions 63 via a second access port 69. The information returned (ASID; MASK; ADDR; ATTR) is used as described above with reference to FIG. 5 to expand the address and to provide the expanded address as part of an AXI write transaction, which causes the dirty cache line to be written back to memory. This provision of a separate read channel 65 and write channel 68, as well as their respective access ports into the memory region definition storage 63, enhances the throughput of the address expander 62.

Figure 7:
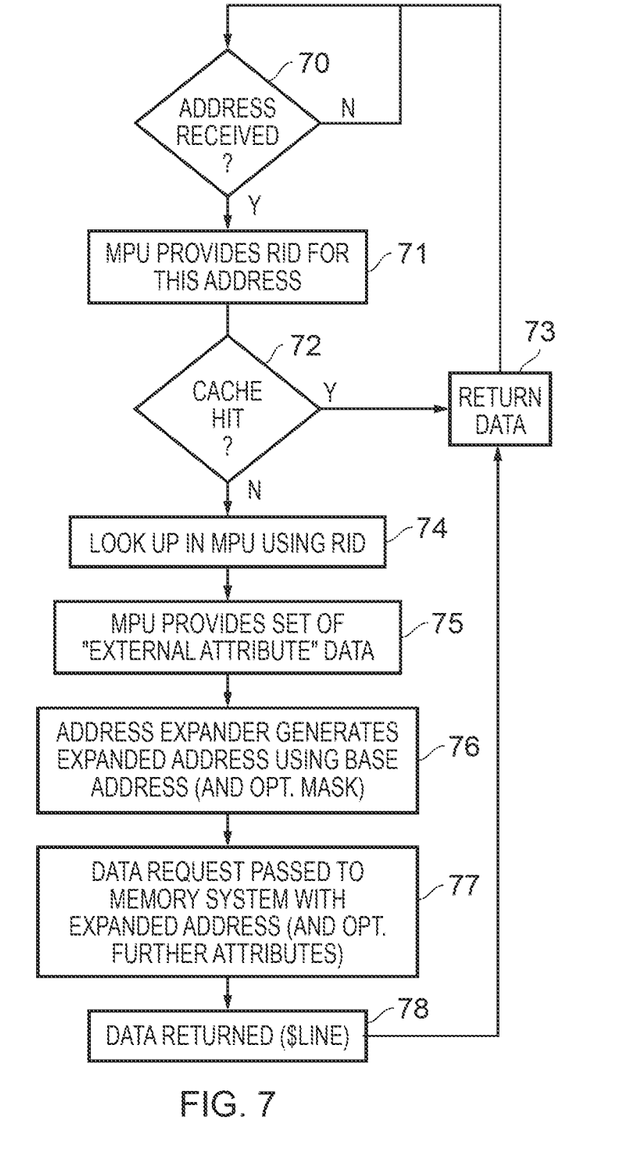
FIG. 7 is a flow diagram showing a sequence of steps which are taken in accordance with the method of some example configurations.

FIG. 7 is a flow diagram showing a sequence of steps which are taken in accordance with the method of some example configurations. The flow can be considered to begin at step 70, where the process waits until an address is received. Then at step 71 an MPU provides the corresponding region identifier RID for this address. It is then determined at step 72 whether, following a cache lookup, a cache hit has occurred. If it has then at step 73 the required data is returned by the cache, and the flow returns to step 70. In the event of a cache miss the flow proceeds to step 74 and a lookup in the MPU using the RID is performed. In response, at step 75, the MPU provides a set of external attribute data for this RID. Then at step 76 and address expander generates an expanded address from the received address using a base address from the external attribute data (and optionally a mask value). Then at step 77 a data request is passed to the external memory system including the expanded address (and optionally further information or attributes, as may be given by the external attribute data). In response to the data request (after some usual delay) the requested data is returned at step 78 (typically in the form of a cache line of data) and at step 73 the requested data is returned.

Figure 8:
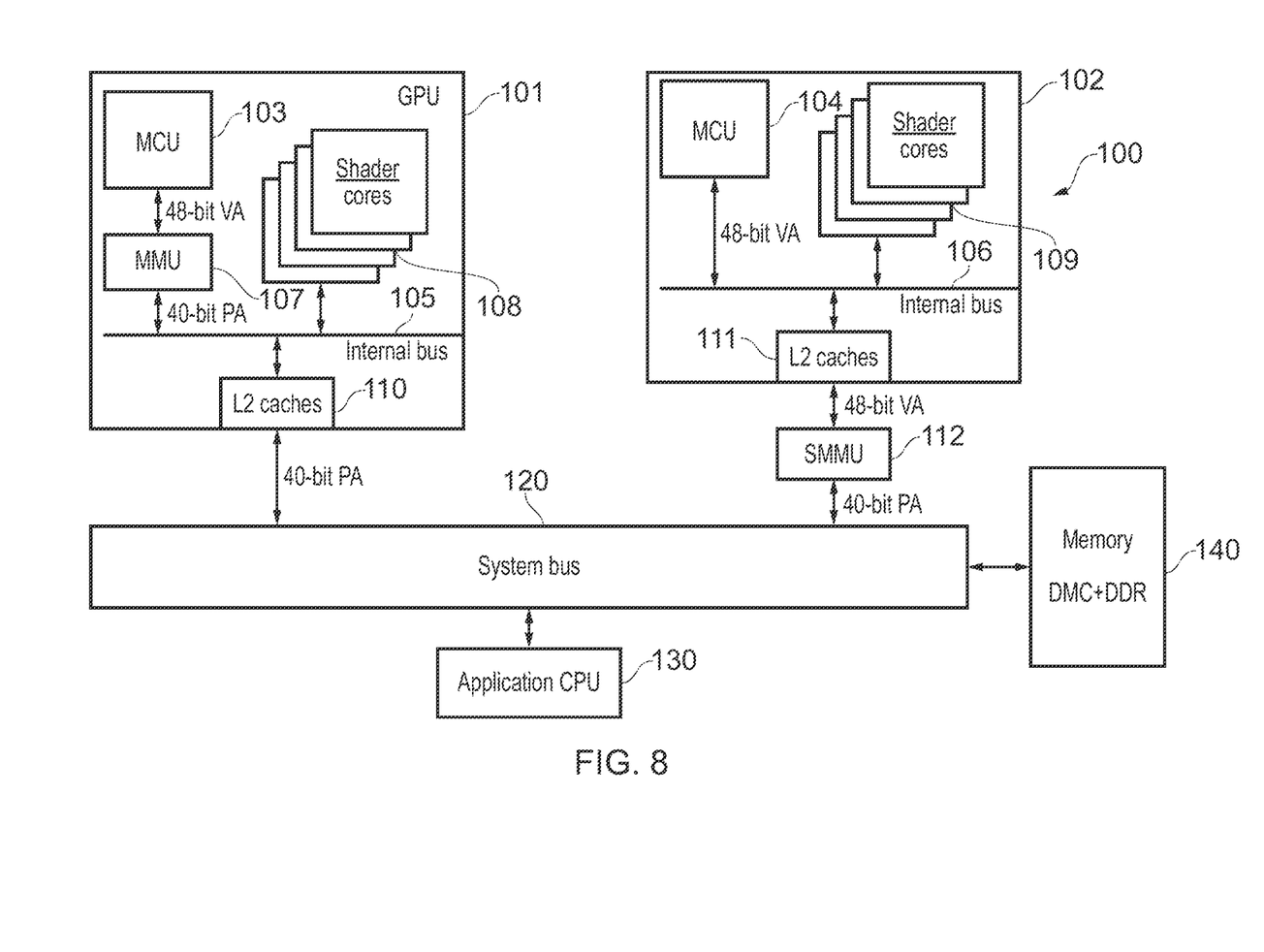
FIG. 8 schematically illustrates a data processing system in accordance with some example configurations.

FIG. 8 schematically illustrates a data processing system 100 in accordance with some examples. The system 100 is shown to comprise two GPUs 101, 102 each provided with a control MCU 103, 104 embedded within it. The respective MCUs share their GPU's memory system and are coupled to other components of the GPU via and internal bus 105, 106. MCU 103 is coupled to the internal bus 105 via an MMU 107 (which converts 48-bit virtual addresses into 40-bit physical addresses). The primary functional components of the GPUs in each case are the set of shader cores 108, 109 which are coupled to the respective internal buses 105, 106. The GPU 101 further comprises L2 caches 110, via which the GPU 101 is coupled to a system bus 120. The GPU 102 further comprises L2 caches 111, via which the GPU 101 is coupled to a system MMU (SMMU) 112, which in turn couples to the system bus 120. The system bus 120 couples to an application CPU 130 and to memory 140 (which in FIG. 8 is shown to comprise both a direct memory controller (DMC) as well as the DDR itself).

It should be noted that each of the MCUs 103, 104 is configured in accordance with one of the example MCU configurations discussed herein, i.e. in particular each MCU itself natively operates in respect of 32-bit addresses, but the address expansion capability which the present techniques provide enable the expansion of such 32-bit addresses into a "larger" address space, which in the example of FIG. 8 is shown to be 48-bit addressing. The effect of this address expansion, in the example of FIG. 8, is that it allows each MCU 103, 104 to use extra functionality of the respective GPUs memory system, such as virtual-to-physical address translation and larger caches. The virtual-to-physical address translation is of note in this example, as it effectively introduces a "third" address into the system. That is to say, where the MCU operates in terms of "first" addresses (the 32-bit memory domain), these get expanded into "second" addresses which are the GPU's virtual addresses (e.g. 48-bit VAs). In turn those virtual addresses are translated into "third" addresses, these being the system's physical addresses (e.g. 40-bit PAs). In fact, it should further be noted that for virtualisation use-cases with two-stage translation, there are in fact intermediate physical addresses (IPAs) as well as final physical addresses (PAs). Also note that FIG. 8 shows two alternative arrangements: one where the GPU 101 supports internal address translation (and for this reason MMU 107 is provided); and one where the GPU 102 doesn't support internal address translation (has no MMU), but instead uses a System MMU (SMMU 112) externally in order to provide the required virtual to physical translations before the system bus.

In brief overall summary apparatuses for address expansion and methods of address expansion are disclosed. Memory region definitions are stored, each comprising attribute data relevant to a respective memory region. In response to reception of a first address a region identifier indicative of a memory region to which the first address belongs is provided. Cache storage stores data in association with an address tag and in response to a cache miss a data retrieval request is generated. Address expansion circuitry is responsive to the data retrieval request initiate a lookup for attribute data relevant to the memory region to which the first address belongs. The address expansion circuitry expands the first address in dependence on a base address forming part of the attribute data to generate an expanded second address, wherein the expanded second address is part of greater address space than the first address.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. A method of address expansion comprising:
   storing memory region definitions in memory region definition storage, wherein each memory region definition comprises attribute data relevant to a respective memory region;
   generating, in response to reception of a first address, a region identifier indicative of a memory region to which the first address belongs;
   caching data retrieved from a memory location indicated by the first address, wherein the data is stored in association with an address tag derived from the first address;
   generating, in response to a cache miss with respect to the first address, a data retrieval request to retrieve the data, wherein the data retrieval request comprises the first address;
   triggering a lookup in the memory region definition storage, in response to the data retrieval request, for external attribute data forming part of the attribute data relevant to the memory region to which the first address belongs,
   wherein the first address is part of a lesser address space and the external attribute data comprises a second address, wherein the second address is part of a greater address space; and
   expanding the first address, in response to the external attribute data received from the memory region definition storage, in dependence on the second address to generate an expanded second address, wherein the expanded second address is part of the greater address space.

2. An apparatus comprising:
   memory protection circuitry comprising memory region definition storage configured to store memory region definitions, wherein each memory region definition comprises attribute data relevant to a respective memory region,
      wherein the memory protection circuitry is responsive to reception of a first address to generate a region identifier indicative of a memory region to which the first address belongs;
   cache storage configured to store data retrieved from a memory location indicated by the first address, wherein the data is stored in association with an address tag derived from the first address,
      wherein the cache storage is responsive to a cache miss with respect to the first address to generate a data retrieval request to retrieve the data, wherein the data retrieval request comprises the first address; and
   address expansion circuitry responsive to the data retrieval request to trigger a lookup in the memory region definition storage for external attribute data forming part of the attribute data relevant to the memory region to which the first address belongs,
      wherein the first address is part of a lesser address space and the external attribute data comprises a second address, wherein the second address is part of a greater address space,
      and the address expansion circuitry is responsive to the external attribute data received from the memory region definition storage to expand the first address in dependence on the second address to generate an expanded second address, wherein the expanded second address is part of the greater address space.

3. The apparatus as claimed in claim 2, wherein the cache storage is further configured to store the region identifier in association with the address tag,
   and wherein the cache storage is responsive to the cache miss with respect to the first address to generate the data retrieval request further comprising the region identifier.

4. The apparatus as claimed in claim 3, wherein the cache storage responsive to a cache maintenance signal, wherein the cache maintenance signal comprises a region identifier signal, to carry out a cache maintenance operation with respect to content of the cache storage which is stored in association with a region identifier corresponding to the region identifier signal.

5. The apparatus as claimed in claim 4, wherein the cache maintenance signal is a cache invalidation signal and the cache maintenance operation is a cache invalidation operation.

6. The apparatus as claimed in claim 2, wherein the external attribute data received from the memory region definition storage comprises a mask value, and the address expansion circuitry is configured to apply the mask value to the first address utilize a subset of the first address when generating the expanded second address.

7. The apparatus as claimed in claim 2, wherein the external attribute data received from the memory region definition storage comprises an address space identifier for use in the greater address space,
   wherein the address expansion circuitry is configured to interface to a system bus,
   and the address expansion circuitry is configured to provide the expanded second address and the address space identifier as a transaction to be conveyed via the system bus.

8. The apparatus as claimed in claim 2, wherein the external attribute data received from the memory region definition storage comprises transaction attributes relevant to the memory region,
   wherein the address expansion circuitry is configured to interface to a system bus,
   and the address expansion circuitry is configured to provide the expanded second address and the transaction attributes as a transaction to be conveyed via the system bus.

9. The apparatus as claimed in claim 8, wherein the address expansion circuitry is configured to provide the transaction attributes as configurable width user bits in the transaction to be conveyed via the system bus.

10. The apparatus as claimed in claim 2, further comprising an initial region setup port arranged to provide access to the memory region definition storage on system start-up to allow setting of the memory region definitions on system start-up.

11. The apparatus as claimed in claim 2, where the cache storage is an instruction cache.

12. The apparatus as claimed in claim 2, where the cache storage is a data cache storage configured to store modifiable data items.

13. The apparatus as claimed in claim 12, wherein the data cache storage is arranged to generate a write back request with respect to dirty data evicted from the data cache storage, wherein the write back request comprises a write back address; and
   the address expansion circuitry is responsive to the write back request to trigger a further lookup in the memory region definition storage for external attribute data forming part of the attribute data relevant to the memory region to which the write back address belongs, and the address expansion circuitry is responsive to the external attribute data received from the memory region definition storage to expand the write back address to generate an expanded write back address.

14. The apparatus as claimed in claim 13, wherein the data retrieval request is received by the address expansion circuitry on a read channel, and the write back request is received by the address expansion circuitry on a write channel, and wherein the address expansion circuitry is configured to multiplex between the data retrieval request and the write back request.

15. The apparatus as claimed in claim 13, wherein the data retrieval request is received by the address expansion circuitry on a read channel, and the write back request is received by the address expansion circuitry on a write channel, wherein the memory region definition storage comprises multiple lookup ports, and wherein the address expansion circuitry is configured to trigger the lookup for the data retrieval request and the further lookup for the write back request via respective lookup ports of the multiple lookup ports.

16. The apparatus as claimed in claim 2, wherein the address expansion circuitry is responsive to the second base address having a value of zero to output the first address unmodified.

17. The apparatus as claimed in claim 2, wherein the address expansion circuitry is responsive to the data retrieval request to trigger a first lookup in the memory region definition storage for the region identifier indicative of the memory region to which the first address belongs, and, subsequently as a second lookup, the lookup in the memory region definition storage for the external attribute data forming part of the attribute data relevant to the memory region to which the first address belongs.

\* \* \* \* \*